United States Patent [19]

Sugishima et al.

[11] Patent Number: 4,914,475

[45] Date of Patent: Apr. 3, 1990

[54] EDITING AREA SETTING METHOD AND EDITING AREA SETTING APPARATUS IN AN IMAGE FORMING APPARATUS

[75] Inventors: Yoshio Sugishima, Fukushima; Masashi Matsumoto, Higashiosaka, both of Japan

[73] Assignee: Mita Industrial Co., Ltd., Osaka, Japan

[21] Appl. No.: 126,371

[22] Filed: Nov. 30, 1987

[30] Foreign Application Priority Data

Nov. 28, 1986 [JP] Japan ................................ 61-285543

[51] Int. Cl.$^{4}$ ........................ G03G 21/00; G03B 27/62

[52] U.S. Cl. .................................... 355/202; 355/218; 355/74

[58] Field of Search .................. 355/7, 8, 14 R, 14 E, 355/55, 74, 202, 218, 328

[56] References Cited

U.S. PATENT DOCUMENTS

| | | | |
|---|---|---|---|
| 4,346,982 | 8/1982 | Nakajima et al. | 355/7 X |
| 4,437,756 | 3/1984 | Yagasaki et al. | |
| 4,666,288 | 5/1987 | Watanabe . | |
| 4,678,315 | 7/1987 | Watanabe . | |
| 4,710,044 | 10/1987 | Horiuchi et al. | 355/7 |
| 4,720,729 | 1/1988 | Watanabe | 355/7 X |

FOREIGN PATENT DOCUMENTS

| | | | |
|---|---|---|---|
| 186743 | 10/1983 | Japan | 355/7 |

*Primary Examiner*—A. T. Grimley
*Assistant Examiner*—E. J. Pipala
*Attorney, Agent, or Firm*—Beverdige, DeGrandi & Weilacher

[57] ABSTRACT

An editing area setting method and an editing area setting apparatus in an image forming apparatus, wherein a plurality of rectangular areas for trimming and masking are set, under a condition whereby partial overlapping does not occur, co-ordinates corresponding to a plurality of diagonal points are sequentially inputted whereby a plurality of rectangular areas are set, and an area inside or outside of one of the rectangular areas is set as an image forming area, the other area is set as a non-image forming area.

6 Claims, 6 Drawing Sheets

EDITING AREA SETTING METHOD AND EDITING AREA SETTING APPARATUS IN AN IMAGE FORMING APPARATUS

BACKGROUND OF THE INVENTION

The present invention relates to an editing area setting method and an editing area setting apparatus in an image forming apparatus which is capable of setting a synthetic area comprising a plurality of rectangular areas, as an editing area.

For the purpose of forming an image within a part of an original document (hereafter called trimming) or of forming an image within a section excluding a part of an original document (hereafter called masking) in an image forming apparatus such as an electrophotographic copying apparatus, there has conventionally been provided an image forming apparatus which is given an editing function.

In such an image forming apparatus as above, the following three methods are proposed for setting an area to accomplish trimming and masking: (A) a method wherein an area to be edited is limited to a rectangular area only and one rectangular area to be edited is set by inputting co-ordinates of only diagonal points of the rectangular area, (B) a method wherein an arbitrary polygonal area is used without limiting an area to be edited to a rectangular area and the polygonal area to be edited is set by sequentially inputting co-ordinates of every vertex thereof (Unexamined Japanese Patent Publication No.213168/1985), and (C) a method wherein at least four points of an image area are inputted and at least one outside area or one inside area is specified so that it is made possible to perform either of partial deletion, partial insertion, and circumferential deletion of the specified area (Unexamined Japanese Patent Publication No.3179/1986).

In the editing area setting method of the above (A), an area is set by inputting the co-ordinates of only diagonal points of a rectangular area, but with this method it is only possible to edit an area with respect to one rectangular area and there exists a problem that it is totally impossible to set an area of a shape other than rectangular. Particularly, it was entirely impossible to set a rectangular masking area inside of a rectangular area to be trimmed or to set a rectangular trimming area inside of a rectangular area to be masked.

Further in the editing area setting method of the above (B), because the co-ordinates corresponding to every vertex of a polygonal area must be inputted, there exists a problem that the co-ordinate inputting operation becomes complicated. Especially, even in case where it is sufficient to input the co-ordinates of a diagonal point to set a rectangular area, co-ordinates of four points must be inputted.

Furthermore, in the editing area setting method of the above (C), there exists problems that the coordinates of at least four points must be inputted, that it is necessary to input the co-ordinate of the point which corresponds to the outside or inside of the set area, and that the co-ordinate inputting operation becomes further complicated.

SUMMARY OF THE INVENTION

An object to the present invention is to provide an editing area setting method and an editing area setting apparatus in an image forming apparatus, wherein it is possible to cause the number of co-ordinate inputting operation for setting a rectangular area to be reduced and to set a rectangular area which is to perform the reverse editing operation inside of a rectangular area which is set for trimming or masking purpose.

For the purpose of achieving the foregoing object, an editing area setting method in an image forming apparatus of the present invention comprises sequentially inputting co-ordinates which correspond to diagonal points of rectangles which will not partially overlap so as to set a plurality of rectangular areas, and setting one side divided by edges of the rectangular areas as an image forming area, and the other side as a non-image forming area.

According to the editing area setting method of above, because co-ordinates which correspond to diagonal points of a plurality of rectangular areas which will not partially overlap, at least one small rectangular area can be set inside of the largest rectangular area, and one side can be set as an image forming area and the other side can be set as a non-image forming area with respect to boundaries which are formed by outer edges of the rectangular areas. Especially, in case the outer edges of both rectangular areas agree on one or two sides of rectangles, it is possible to set a concave area or an L-shaped area.

When sequentially inputting co-ordinates corresponding to a plurality of diagonal points which will not partially overlap, it is preferable to previously specify a trimming rectangular area and a masking rectangular area, and in this case, it is possible to accomplish the setting operation of the rectangular area and the specifying operation of the image forming area in one single operation.

For the purpose of achieving the foregoing object, an editing area setting apparatus of the present invention comprises mode selecting means which selects a mode to set a plurality of rectangular areas as a trimming area or a masking area, rectangular area setting means which sets a plurality of rectangular areas by sequentially inputting co-ordinates corresponding to diagonal points when a selection signal is received from the mode selecting means indicating that the mode which sets a plurality of rectangular areas is selected, area location detecting means which detects a location of a trimming area and a masking area, co-ordinate data judging means which judges whether rectangular areas made up by the input co-ordinate data of each pair partially overlap or not, and image forming control means which selectively forms an image in an image forming area based on a condition that a judging signal is received from the co-ordinate data judging means indicating that rectangular areas do not partially overlap.

In the editing area setting apparatus having a constitution such as above, a mode for setting a plurality of rectangular area as a trimming area or a masking area is selected by the mode selecting means beforehand, and a plurality of rectangular area is set by the rectangular area setting means as a trimming area and a masking area. And either the trimming or masking is specified by an area specifying means. Further, it is judged by the co-ordinate data judging means whether rectangular areas composed of input co-ordinate data of each pair accepted are partially overlapped. If in case it is judged that they are not partially overlapped, it becomes possible to accomplish an image forming operation in accordance with the areas specified as above.

Therefore, at least one small rectangular area is set inside of the largest rectangular area, it is possible to set one side as an image forming area and the other side as a non-image forming area with respect to boundaries which are formed by an outer edge of each rectangular area, and in particular, if in case the outer edges of two rectangular areas agree in part, it becomes possible to set a concave area.

The features of the present invention will further be apparent by providing the following description with reference to the attached drawings.

BRIEF DESCRIPTION, OF THE DRAWINGS

.DETAILED DESCRIPTION OF THE EMBODIMENTS

Figure 7:
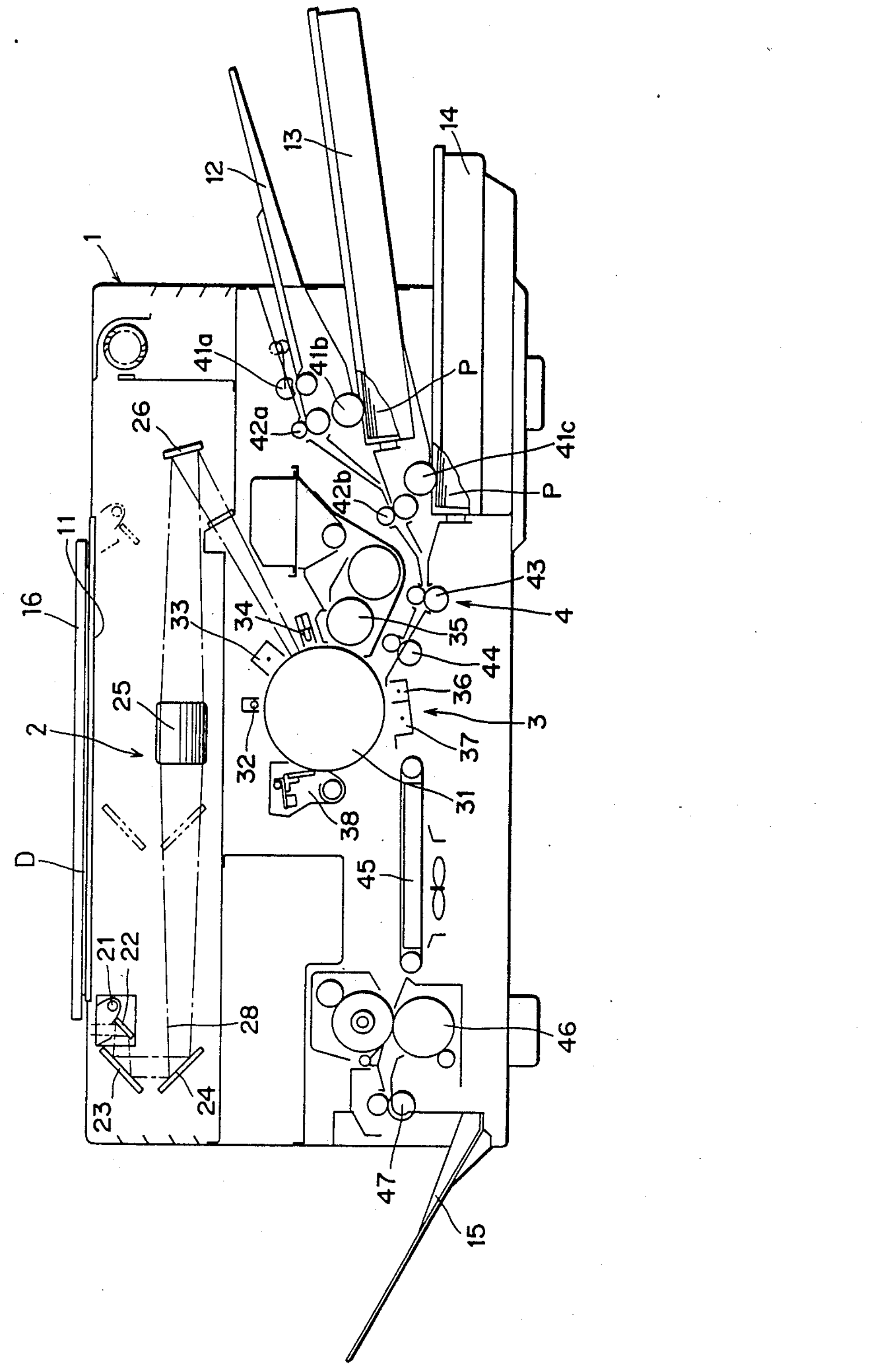
FIG. 7 is a schematic diagram showing the inside constitution of the electrophotographic copying apparatus.

FIG. 7 is a schematic diagram showing an inside constitution of an electrophotographic copying apparatus, at the upper part thereof are installed an optical system 2, image processing section 3, and paper conveying section 4 inside of the body of the electrophotographic copying apparatus having a transparent plate 11 and an original document presser 16.

To give more detailed description, the above optical system 2 comprises a light source 21 for illuminating an original document D set on the top surface of the transparent plate 11, mirrors 22, 23, and 24 for sequentially reflecting the reflecting light from the original document D, a lens 25, and a mirror 26, wherein the light source 21 and the mirror 22 are caused to move integrally at a prescribed speed, and by causing the mirrors 23 and 24 to move in the same direction at a half the moving speed of the light source 21, it is made possible to sequentially illuminate all over the surface of the original document D and to lead the reflecting light to the image processing section 3 through the lens 25 and the mirror 26.

The image processing section 3 of above is disposed around the photoreceptor drum 31 which always rotate in one direction, with components according to the order of a discharger lamp 32, a corona discharger 33, blank lamp 34, a developing device 35, a transferring corona discharger 36, a separating corona discharger 37, and a cleaner 38. After the uniform charging is accomplished by the corona discharger 33 with respect to the surface of the photoreceptor drum 31 wherefrom the residual charge was caused to disappear by the discharging lamp 32, an electrostatic latent image is formed corresponding to an image of the original document by leading the reflecting light from the original document D, the charge of the unnecessary portion is caused to disappear by the blank lamp 34, the portion which was not caused to disappear is formed into a toner image by the developing device 35, and the toner image is transferred on the copying paper P by the transferring corona discharger 36. Thereafter, the copying paper P is caused to peel off from the photoreceptor drum 31 by the separating corona discharger 37, so as to finally recover the remaining toner on the surface of the photoreceptor drum 31 by the cleaner 38.

The paper conveying section 4 of above comprises paper feeding rollers 41*a* through 41*c*, delivery rollers 42*a* and 42*b*, registration roller 43, delivery roller 44, delivery belt 45, fixing device 46, and discharging roller 47. By selectively driving any of the above paper feeding rollers 41*a* through 41*c*, the copying paper P is supplied sheet by sheet from any of the stack bypass 12, paper feeding cassettes 13 and 14 installed on a prescribed position on the side of the body 1 of the electrophotographic copying apparatus, and by providing a delivery force to the delivery rollers 42*a* or 42*b* as required, the tip of the copying paper P is caused to contact the registration roller 43 and to slightly deflect so as to accomplish the tip correction. Afterwards, the registration roller 43 is driven according to a timing of the light source 21 which has reached a position to start illumination of the original document D, and the copying paper P is conveyed under a condition where the copying paper P is caused to synchronize with the electrostatic latent image formed on the surface of the photoreceptor drum 31. The copying paper P is transferred with the toner image by the transferring corona discharger 36 and is caused to peel off from the photoreceptor drum 31 by the separating corona discharger 37. Afterwards, the copying paper P is led to the fixing device 46 by the delivery belt 45 so that the toner image is heated and fixed, and is discharged by the discharging roller 47 onto the paper tray 15 installed on the side opposite to the body 1 of the electrophotographic copying apparatus.

Figure 6:
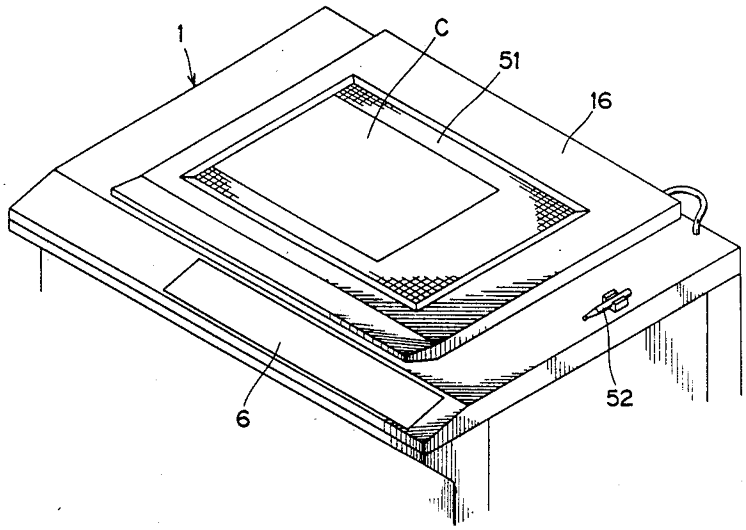
FIG. 6 is a perspective view of an electrophotographic copying apparatus.

FIG. 6 is a perspective diagram of the appearance of the electrophotographic copying apparatus, in which a co-ordinate input panel 51 is installed at a prescribed position on an original document presser 16 installed rotatably on the upper part of the transparent plate, a co-ordinate inputting pen 52 is detachably installed at a prescribed position on the upper surface of the electrophotographic copying apparatus 1, and an operation panel 6 is installed close toward the upper surface of the body 1 of the electrophotographic copying apparatus.

Figure 5:
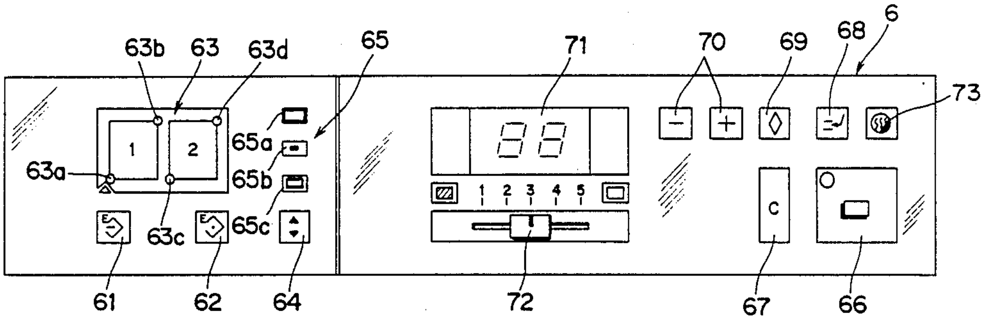
FIG. 5 is a plan view illustrating a constitution of an operation panel.

FIG. 5 is a diagram showing the detail of the operation panel 6, wherein keys for setting editing areas and indicators are provided at the left side, and keys for setting conditions of normal copying operation and indicators are provided at the right side. To describe it further in detail, on the left side are installed a coordinate input key 61, co-ordinate calling key 62, coordinate input status indicator 63, mode selecting key 64, and mode indicator 65. On the right side are provided a print key 66, clear key 67, interrupt key 68, total copy number of sheets calling key 69, up-down key 70, number of copy indicator 71, copying density setting knob 72, and warm-up indicator 73. In this embodiment, the above co-ordinate input status indicator 63 comprises four LEDs 63*a* through 63*d* so that it is made possible to set two rectangular areas. Further, the mode indicator 65 is consisted of a trimming mode display section 65*a*, masking mode display section 65*b*, synthesizing mode (a mode to set a rectangular area which is to perform masking or trimming operation in an area inside of a rectangular area set for trimming or masking) display section 65*c* with LEDs respectively, and by operating the mode selecting key 64, it is possible to select a condition where either of these three display sections is caused to turn on (a condition where a mode corresponding to the display section 65*a* to 65*c* that has turned on is selected) or a condition where neither of these display sections 65*a* to 65*c* is caused to turn on (a condition where the editing function is not used).

When inputting co-ordinates to set an editing area in the synthesizing mode actually, an original document is set on the transparent plate 11, one copying operation is accomplished, and a copy C obtained is set on the co-ordinate input panel 51 with the image surface facing upward. Further, the mode selecting key 64 is manipulated to select the editing mode into the synthesizing mode, the co-ordinate of one point is inputted by operating the co-ordinate inputting key 61 while pressing a desired point of the copy C by using the co-ordinate inputting pen 52, hereafter by accomplishing a number of necessary pressing operation using the co-ordinate inputting pen 52 and inputting operation using the coordinate inputting key 61, it is possible to firstly set a rectangular area which is to be trimmed and to secondarily set the rectangular area which is to be masked.

Figure 1:
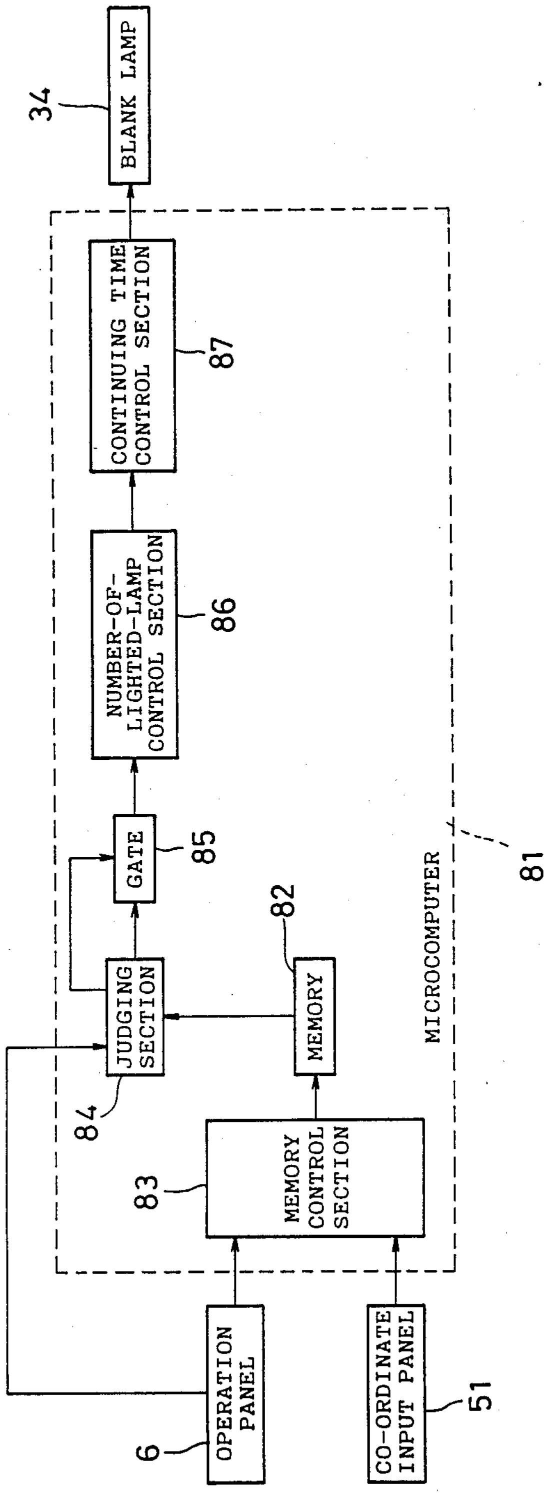
FIG. 1 is a block diagram showing an embodiment of an editing area setting apparatus according to the present invention.

FIG. 1 is a block diagram showing an embodiment of the editing area setting apparatus of the present invention, wherein signals from various keys of the operation panel 6 and signals from the co-ordinate inputting panel 51 are supplied to a microcomputer 81 through A/D converter and I/O interface (both are not shown in the diagram), and the output signal from the microcomputer 81 is supplied to the blank lamp 34 through the I/O interface (not shown in the diagram).

Furthermore, the microcomputer 81 has function blocks such as the following. That is to say, the microcomputer 81 comprises a memory 82 which stores x coordinates (the co-ordinates in the exposing direction) x1 and x2, and y co-ordinates (the co-ordinates in axial direction of the photoreceptor drum 31) y1 and y2 of the diagonal points of a rectangular area, a memory control section 83 which stores the co-ordinate data from the co-ordinate inputting panel 51 into an applicable area in the memory 82 when the co-ordinate inputting key signal is inputted, an judging section 84 which reads out the co-ordinate data stored in the memory 82 when the mode selecting key signal indicating that the synthesizing mode is selected is inputted and judges whether both rectangular areas partially overlap based on the read-out data, a gate 85 which is opened when a judging signal from the judging section 84 indicating that both rectangular areas are not partially overlapped is inputted, a number-of-lighted-lamp control section 86 which generates signals that control lighting of each photo emitter to comprise the blank lamp 34 when the co-ordinate data are inputted through the gate 85, and a continuing time control section 87 which generates signals that control the time to turn on and the time to turn off each photo emitter.

Figure 2:
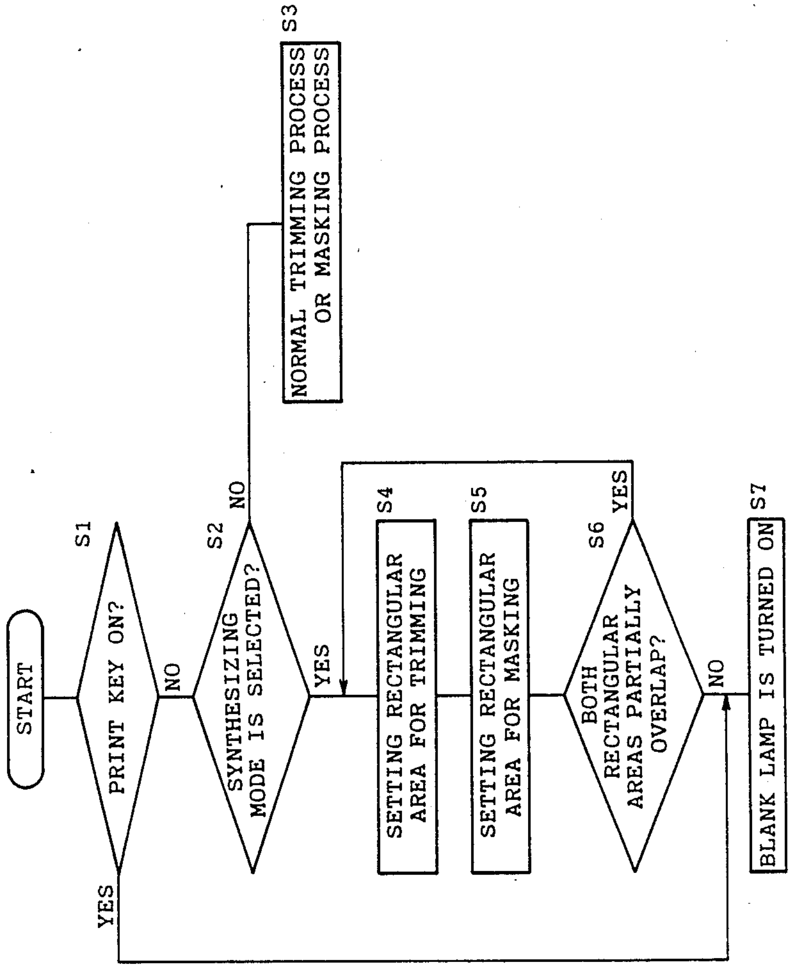
FIG. 2 and FIG. 3 are flowcharts for describing editing area setting operation.

FIG. 2 is a flowchart to describe operations when accomplishing editing operation with respect to the rectangular area set by the editing area setting apparatus having the foregoing constitution, wherein in step S1 it is judged whether the print key 66 is operated, and if not operated, in step S2 it is judged whether the synthesizing mode is selected by the mode selecting key 64.

If it is judged that the trimming or masking is simply selected, in step S3 it is possible to form an image which corresponds only to the necessary portion by performing normal trimming process or masking process.

In the above step S2, if it is judged that the synthesizing mode is selected, in step S4 by inputting co-ordinates of two points for trimming (xt1, yt1 for point A, and xt2, yt2 for point B, provided that $xt1<xt2$ and $yt1<yt2$) the rectangular area for trimming is set, and by inputting in step S5 co-ordinates of two points for masking (xm1, ym1 for point C and xm2, ym2 for point D, provided that $xm1<xm2$, and $ym1<ym2$) the rectangular area for masking is set, and afterward, in step S6 it is judged whether both rectangular areas are partially overlapped (including a condition where both rectangular areas are not overlapped at all).

To describe more in detail of the judging operation of the above, based on the above co-ordinate data, it is judged that the two rectangular areas are not partially overlapped only when $xt1\leqq xm1$, $yt1\leqq ym1$, $xm2\leqq xt2$ and $ym2\leqq yt2$ (provided that conditions of $xt1=xm1$, $xm2=xt2$, $yt1=ym1$, and $ym2=yt2$ are excluded) or when $xt1\geqq xm1$, $yt1\geqq ym1$, $xm2\geqq xt2$ and $ym2\geqq yt2$ (provided that $xt1=xm1$, $xm2=xt2$, $ym1=yt1$, and $ym2=yt2$ are excluded), and it is judged that the two rectangular areas are partially overlapped in cases other than the above.

Furthermore, if in case it is judged that the two rectangular areas are partially ovarlapped, the coordinate inputting data are not accepted and the coordinate inputting operations are caused to be performed again in the foregoing steps S4 and S5.

Conversely, if in case it is judged that partial overlapping is not generated, in step S7 by causing the blank lamp 34 to turn on according to the co-ordinate inputting data which corresponds to both rectangular areas, it is possible to form an edited image synthesized of trimming and masking.

If in case it is judged in the foregoing step S1 that the print key 66 is operated, the foregoing step S7 is processed as it is.

Figure 3:
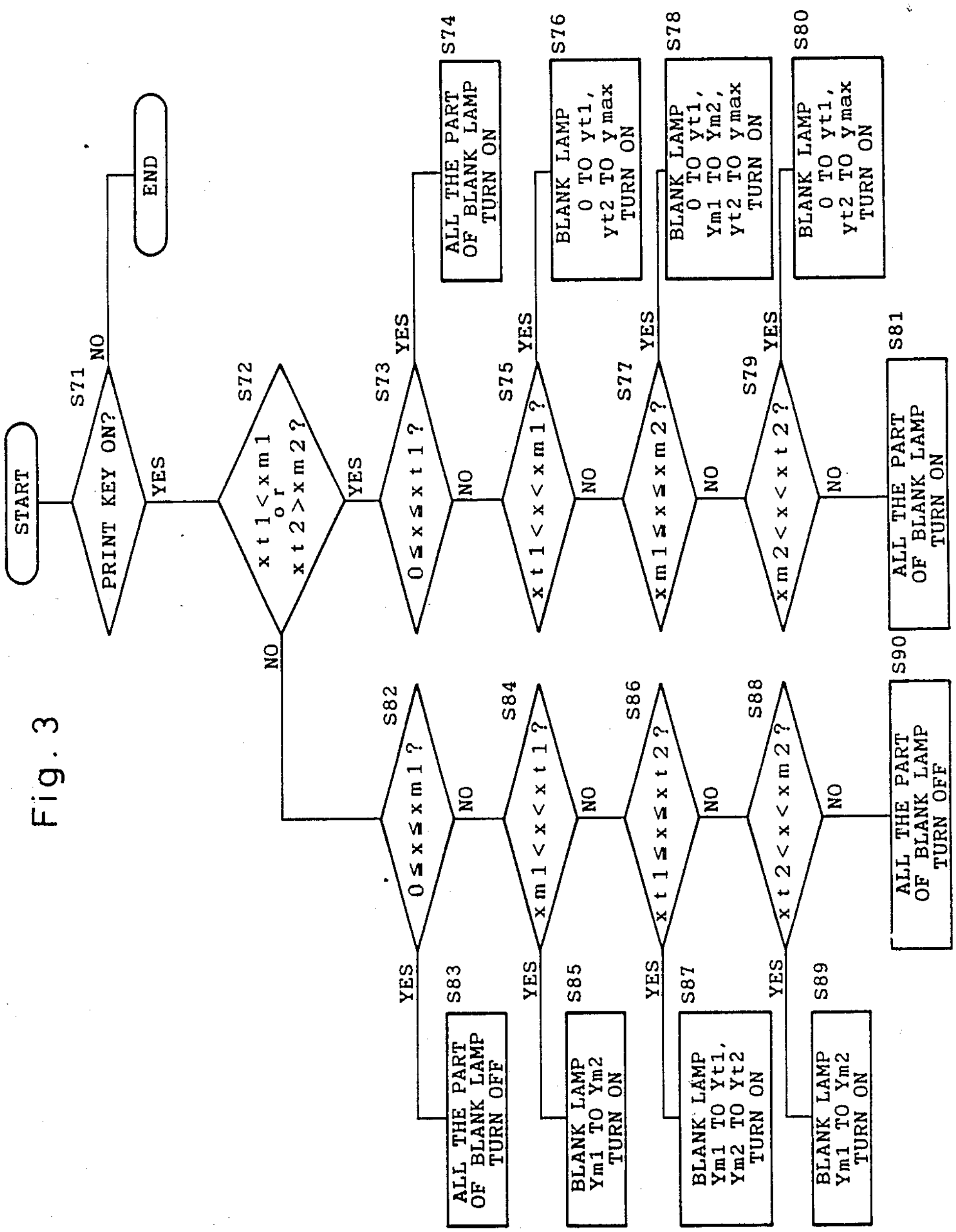
Figure 4:
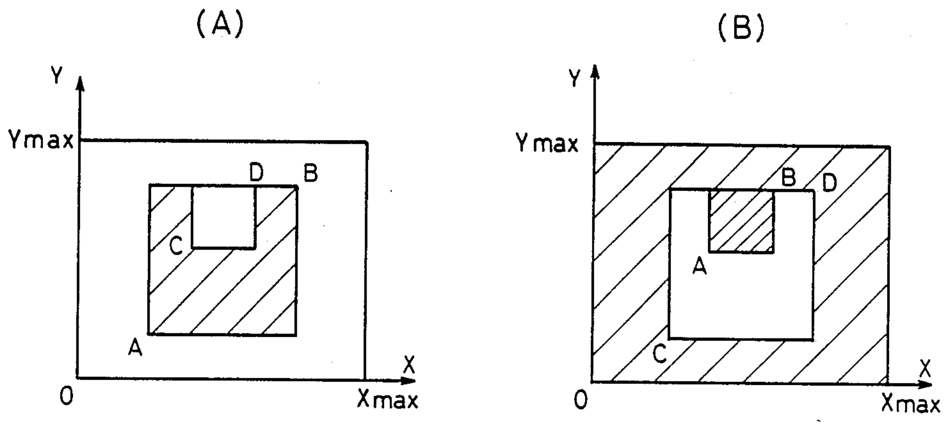
FIG. 4 is a schematic diagram showing an image obtained by editing operation.

FIG. 3 is a flowchart which gives detailed description of the step S7 in the flowchart shown in FIG. above, in step S71 it is judged whether the print key is operated, and if judged as not operated, the process is ended. Conversely, if in case it is judged that the print key 66 is operated, in step S72 it is judged whether conditions are $xt1<xm1$ or $xt2>xm2$, in this step the microcomputer 81 functions as an area location detecting means. And, if in case it is judged that conditions are $xt1<xm1$ or $xt2>xm2$ (refer to FIG. 4A), the step goes to the step S73 and on further, and in steps S73, S75, S77, and S79 it is sequentially judged whether $0\leqq x\leqq xt1$ (x in this case is an x co-ordinate of a portion where an original documents is exposed and scanned), whether $xt1<x<xm1$, whether $xm1\leqq x\leqq xm2$, and whether $xm2<x<xt2$, and if it is judged that $0\leqq x\leqq xt1$, all of the photo emitters of the blank lamp 34 are caused to turn on in step S74, if in case it is judged that conditions are $xt1<x<xm1$, the photo emitter which corresponds to 0 to yt1 and yt2 to ymax of the blank lamp 34 is caused to turn on in step S76, if in case it is judged that conditions are $xm1\leqq x\leqq xm2$, the photo emitter which corresponds to 0 to yt1, ym1 to ym2, and yt2 to ymax of the blank lamp 34 in step S78 is caused to turn on, if in case it is judged that conditions are $xm2<x<xt2$, the photo emitter which corresponds to 0 to yt1 and yt2 to ymax of the blank lamp 34 is caused to turn on in step S80, and if in case it is judged that neither conditions are agreed (in case $xt2\leqq x$), all of the photo emitters of the blank lamp 34 are caused to turn on in step S81. Therefore, it is possible to cause to accomplish the image formation only in a portion which is the outside of the smallest rectangular area and is the inside of the largest rectangular area.

Conversely, if in case it is judged that conditions are neither $xt1<xm1$ or $xt2>xm2$ (refer to FIG. 4B), in steps S82, S84, S86, and S88 it is judged sequentially whether conditions are $0\leqq x\leqq xm1$, whether $xm1<x<xt1$, whether $xt1\leqq x\leqq xt2$, and whether $xt2<x<xm2$, if in case it is judged that conditions are $0\leqq x\leqq xm1$, all of the photo emitters of the blank lamp 34 are caused to turn off in step S83, if in case it is judged that conditions are $xm1<x<xt1$, only the photo emitter which corresponds to ym1 to ym2 of the blank lamp 34 is caused to turn on in step S85, if in case it is judged that conditions are $xt1\leqq x\leqq xt2$, only the photo emitter which corresponds to ym1 to yt1 and ym2 to yt2 of the blank lamp 34 is caused to turn on in step S87, if in case it is judged that conditions are $xt2<x<xm2$, only the photo emitter which corresponds to ym1 to ym2 of the blank lamp 34 is caused to turn on in step S89, if in case it is judged that neither conditions are agreed (in case $xm2\leqq x$), all of the photo emitters of the blank lamp 34 are caused to turn off in step S90. Therefore, it becomes possible to accomplish the image formation in the inside of the smallest rectangular area and the image formation in the outside of the largest rectangular area.

To summarize the above, if in case two rectangular areas are set in a condition where a partial overlapping will not be caused to generate, it is possible to control the blank lamp 34 so as to perform copying process in accordance with the specified trimming and masking.

Further, if in case it is judged in step S6 of the flowchart of FIG. 2 that there exists a partial overlapping of rectangular areas, the co-ordinate input is made to become ineffective. In this case, it is preferable to indicate that the co-ordinate input is made to be ineffective by causing either one of LEDs to blink and by causing other LEDs to turn off, or to indicate that the co-ordinate input is made to be ineffective by causing all LEDs to blink.

Furthermore, it shall be understood that the present invention is not limited to the embodiments of above but it is possible that by for example inputting the coordinates with the mode selecting key being operated to trimming mode or masking mode, to cause three or more rectangular areas to be set. In addition, if in case rectangular areas which partially overlap is set, it is also possible to make ineffective of only the co-ordinate input of the rectangular area which is set afterward, and further, if in case a plurality of rectangular areas which are set inside of a large rectangular area do not overlap at all, it is possible not to make the co-ordinate input ineffective, thereby making it possible to perform various design changes to an extent that the present invention does not depart from the scope and spirit thereof.

According to the present invention as has been described above, it is possible to set a rectangular area for trimming and to set a rectangular area for masking, and since it is possible to cause the image formation to be performed only in the necessary portion with both rectangular areas being synthesized, it becomes possible to improve the degree of freedom if an editing area is to be set, so that an effect can be achieved to simplify the co-ordinate inputting operation for setting each rectangular area.

What is claimed is:

1. An editing area setting method in an image forming apparatus, comprising:

sequentially inputting co-ordinates corresponding to diagonal points of different-sized rectangular areas with one of said rectangular areas being entirely included in another of said rectangular areas so as to set at least one all-inclusive, multiple-rectangle area, and setting an area inside or outside of one of the all-inclusive, multiple-rectangle areas as an image forming area and another area as a non-image forming area.

2. An editing area setting method in an image forming apparatus according to claim 1, further comprising:

specifying a trimming rectangular area and a masking rectangular area when sequentially inputting the co-ordinates corresponding to diagonal points of rectangular areas which do not partially overlap.

3. An editing area setting apparatus in an image forming apparatus, comprising:

mode selecting means which selects a mode used to set a plurality of rectangular areas as a trimming area or a masking area, rectangular area setting means which sets a plurality of rectangular areas by sequentially inputting coordinates corresponding to a pair of diagonal points when a selection signal is received from the mode selecting means which indicates that the mode for setting a plurality of rectangular areas is selected, area location detecting means which detects a location of a trimming area and a masking area, coordinate data judging means which judges whether or not the rectangular area made up by inputting coordinate data of each pair entirely includes another area, and image forming control means which causes an image to be selectively formed into an image forming area when a judging signal is received from the coordinate data judging means indicating that rectangular area entirely includes another area.

4. An editing area setting apparatus in an image forming apparatus according to claim 3, further comprising:

ineffective signal generating means which generates a signal to indicate that setting operation of one or both of the rectangular areas which partially overlap is ineffective when a judging signal is received from the co-ordinate data judging means indicating that rectangular areas are partially overlapped.

5. An editing area setting apparatus in an image forming apparatus according to claim 3, wherein the mode selecting means and rectangular area setting means are caused to operate by operation keys provided on a operation panel of the image forming apparatus.

6. An editing area setting apparatus in an image forming apparatus according to claim 3, wherein the image forming means controls lighting of a blank lamp disposed in the image forming apparatus.

* * * * *

UNITED STATES PATENT AND TRADEMARK OFFICE

CERTIFICATE OF CORRECTION

PATENT NO. : 4,914,475

DATED : April 3, 1990

INVENTOR(S) : Yoshio SUGISHIMA; Masashi MATSUMOTO

It is certified that error appears in the above-identified patent and that said Letters Patent is hereby corrected as shown below:

Column 8, line 60 (Claim 6, line 3) should read:

forming control means controls lighting of a blank lamp dis-

Signed and Sealed this

Seventh Day of April, 1992

*Attest:*

HARRY F. MANBECK, JR.

*Attesting Officer*

*Commissioner of Patents and Trademarks*